United States Patent [19]

Tanaka

[11] 4,272,422
[45] Jun. 9, 1981

[54] AQUEOUS MICROHYDROGEL DISPERSIONS, PROCESSES FOR PRODUCING THE SAME, AND PROCESSES FOR PRODUCING MICROHYDROGELS

[75] Inventor: Koji Tanaka, Okayama, Japan

[73] Assignee: Japan Exlan Company Limited, Osaka, Japan

[21] Appl. No.: 56,314

[22] Filed: Jul. 10, 1979

[30] Foreign Application Priority Data

Aug. 16, 1978 [JP] Japan ............................... 53-100323

[51] Int. Cl.$^3$ ............................................. C08L 33/02
[52] U.S. Cl. ............................................. 260/29.6 AN
[58] Field of Search ............... 260/29.6 AN, 29.6 AB, 260/29.6 AQ, 29.6 TA, 29.6 H, 29.6 SQ, 29.7 H

[56] References Cited

U.S. PATENT DOCUMENTS

| | | | |
|---|---|---|---|
| 3,849,361 | 11/1974 | Zweigle | 260/29.6 SQ |
| 3,937,680 | 2/1976 | de Carle | 260/29.6 TA |
| 4,059,552 | 11/1977 | Zweigle | 260/29.6 TA |
| 4,102,842 | 7/1978 | Fujimoto | 260/29.6 H |
| 4,107,057 | 8/1978 | Dill | 260/29.6 SQ |
| 4,107,121 | 8/1978 | Stoy | 260/29.6 AB |
| 4,172,066 | 10/1979 | Zweigle | 260/29.6 TA |

Primary Examiner—Paul R. Michl
Attorney, Agent, or Firm—Wenderoth, Lind & Ponack

[57] ABSTRACT

The present invention relates to aqueous microhydrogel dispersions composed of hydrogel particles not larger than 1μ dispersed stably in an aqueous medium, to processes for producing the same, and to processes for producing microhydrogel particles having particles diameters not larger than 1μ. Said aqueous microhydrogel dispersions exhibit an excellent water-swelling ability and can be used as property-modifiers for textile products and molded plastic articles; as water-absorbents; moisture-absorbents; soil-improving agents, etc.

20 Claims, No Drawings

AQUEOUS MICROHYDROGEL DISPERSIONS, PROCESSES FOR PRODUCING THE SAME, AND PROCESSES FOR PRODUCING MICROHYDROGELS

BACKGROUND OF THE INVENTION

1. Field of the Invention

The present invention relates to novel aqueous microhydrogel dispersions, to processes for producing the same, and to processes for producing microhydrogels. More particularly, the invention relates to aqueous microhydrogel dispersions composed of extremely fine hydrogel particles which have not been even thought of heretofore, dispersed stably in an aqueous medium, to processes for producing the same, and to processes for producing microhydrogels.

2. Description of the Prior Art

In recent years, substantially water-insoluble and water-swellable substances (hydrogels) obtained by giving a cross-linked structure to water-soluble or hydrophilic polymers, are receiving attention in that they have characteristic properties such as affinity to water, water retention, instantaneous absorbing power of a large amount of water, moisture absorbing power and affinity to the tissues of the human body, and the utilization of said substances for various purposes is now actively studied.

Among others, the attempt to eliminate the generally observed insufficiency in the functions, such as hygroscopicity, water absorption, flame retardancy, etc., of synthetic high polymers which are starting materials for synthetic fiber products and various plastic molded articles, by mixing such hydrogels, is one of the important problems which are expected to attain success. However, it is acknowledged that, when a hydrogel is mixed with a synthetic high polymer material, the values of the dynamic characteristics, such as strength, modulus of elasticity, etc. which are indispensable as fundamental properties of the synthetic high polymer materials are lowered. To solve such problems, it has been strongly demanded to find a concrete industrial means to render the hydrogel fine in diameter.

Among other applications of the hydrogel in addition to the above-mentioned, there may be recited: body fluids absorbing materials such as diapers, sanitary napkins, hemostatic bandages, etc.; applications utilizing the ability of the hydrogel to absorb a large amount of water instantaneously, namely solidifying agents for water-containing muddy substances such as excess sludge generated when treating activated sludge of industrial waste water, human or animal excrement, etc.; applications utilizing the moisture absorbing ability of the hydrogel, such as drying agents for various articles, moisture detecting elements, etc. In such fields of uses, it has been also strongly demanded to establish an industrial means to make the hydogel fine in diameter for the purpose of increasing the water or moisture absorbing rate.

To make the hydrogel fine in diameter, several methods have been proposed, for example, a method wherein dry hydrogel granules are pulverized by means of a ball-mill, etc. and another method wherein hydrogel is dispersed in water to bring it to a swollen state and then it is pulverized by means of a shearing equipment such as a mixer, followed by drying. However, by any of these known methods, the resulting hydrogel particle diameter is usually several hundred microns and even the finest is several ten microns, so that it has been practically impossible to form a hydrogel having an extremely fine particle diameter.

Under such circumstances, the present Applicant proposed a technical means in the previously filed Japanese Patent Application No. 116,322/1976 and No. 143,772/1976, in which an aqueous solution of a hydrophilic polymer containing cross-linkable groups is mixed with a water-miscible organic solvent to precipitate said hydrophilic polymer as fine particles, and then the solvent is removed before or after and/or at the same time with said formation of cross-linked structure, whereby a hydrogel having a particle diameter not larger than $10\mu$ is formed. But these previously filed inventions comprise the step of preparing an aqueous solution of a hydrophilic polymer, the step of precipitating the hydrophilc polymer by mixing a water-miscible organic solvent, the step of forming a cross-linked structure, and/or the step of solvent removal. Because of such complicated process steps, these inventions are not industrially desirable methods. Moreover, it is a problem that these methods require a great amount of water and a water-miscible solvent. Also, the diameter of the hydrogel particles formed by these methods was in the order of $1\mu$ at the smallest.

STATEMENT OF THE INVENTION

In such a situation, the present Applicant studied intensively to completely remedy the above-mentioned defects and to produce an aqueous hydrogel dispersion having an extremely fine particle diameter. As a result, it has been found that an aqueous stable dispersion of a hydrogel having a high degree of water-swellability and a fine particle diameter can be obtained advantageously in one step by causing an alkaline substance to act on an acrylonitrile polymer containing acid groups and a cross-linked structure and having a fine particle diameter, or on an aqueous emulsion of said polymer, to introduce salt-type carboxyl groups. The present invention is based on this finding.

An object of the present invention is therefore to provide a novel aqueous dispersion of a microhydrogel having a fine particle diameter not larger than $1\mu$, a process for producing the same in an industrially advantageous manner, and a process for producing a novel microhydrogel having an extremely fine particle diameter not larger than $1\mu$.

Another object of the present invention is to utilize said microhydrogel having a particle diameter not larger than $1\mu$ and its aqueous dispersion as a property-modifier for textile products or plastic molded articles, and to make said microhydrogel or its dispersion display an excellent water-swelling ability as an water absorbent, moisture absorbent, or soil improving agent.

Other objects of the invention will become apparent from the following description in the specification.

The aqueous microhydrogel dispersion according to the present invention to attain these objects contains salt-type carboxyl groups expressed by $-COOX$ (wherein X is an alkaline metal or ammonium ($NH_4$) ion) in an amount of at least 0.1 m mol/g, and contains a hydrogel having a water-swellability not lower than 3 cc/g and having a particle diameter not larger than $1\mu$ in absolute dryness, stably dispersed in an aqueous medium. This aqueous dispersion can be advantageously produced by causing an alkaline substance to act on an acrylonitrile polymer containing acid groups and a cross-linked structure and whose particle diameter is not larger than 1μ, or on an aqueous emulsion of said polymer to introduce at least 0.1 m mol/g of salt-type carboxyl groups, so as to form an aqueous dispersion in which a hydrogel having a degree of water-swellability not lower than 3 cc/g and having a particle diameter not larger than 1μ in absolute dryness is stably dispersed in an aqueous medium. By isolating said hydrogel from said aqueous dispersion, it is possible to produce the microhydrogel.

DESCRIPTION OF PREFERRED EMBODIMENTS

The present invention will be explained in further detail in the following:

The term "acrylonitrile polymer" as used in the present invention to express the starting material for obtaining the microhydrogel or its aqueous dispersion of the present invention, is a generic term for a polymer produced by copolymerizing acrylonitrile with one or more ethylenic unsaturated compounds and containing acid groups and a cross-linked structure.

The acrylonitrile content in such an acrylonitrile polymer is not less than 30 weight %, preferably not less than 50 weight %, more preferably not less than 70 weight %, based on the total amount of the monomers forming said polymer. If a polymer whose acrylonitrile content is less than the recommended limit is used as the starting material, the polymer will not be made sufficiently hydrophilic by the action of an alkaline substance or even if made hydrophilic, the polymer will not be formed into a hydrogel having a desired degree of water swellability.

The ethylenic unsaturated compounds to be copolymerized with acrylonitrile are known unsaturated compounds copolymerizable with acrylonitrile, for example vinyl halides or vinylidene halides such as vinyl chloride, vinyl bromide, vinylidene chloride, etc.; unsaturated alcohols and ethers thereof such as allyl alcohol, methallyl alcohol, etc.; unsaturated carboxylic acids such as acrylic acid, methacrylic acid, maleic acid, itaconic acid, etc. and salts thereof; acrylic acid esters such as methyl acrylate, ethyl acrylate, butyl acrylate, octyl acrylate, methoxyethyl acrylate, phenyl acrylate, etc.; methacrylic acid esters such as methyl methacrylate, ethyl methacrylate, butyl methacrylate, octyl methacrylate, methoxyethyl methacrylate, phenyl methacrylate, etc.; unsaturated ketones such as methyl vinyl ketone, phenyl vinyl ketone, methyl isopropenyl ketone, etc.; vinyl esters such as vinyl formate, vinyl acetate, vinyl propionate, vinyl butyrate, vinyl benzoate, etc.; acrylamide and its alkyl substituted compounds; unsaturated hydrocarbon sulfonic acids such as vinylsulfonic acid, allylsulfonic acid, methallylsulfonic acid, p-styrenesulfonic acid, etc. and salts thereof; 2-acrylamide-2-methylpropanesulfonic acid and salts thereof; acrylic or methacrylic acid sulfoalkyl esters such as sulfobutyl acrylate, sulfoethyl methacrylate, sulfopropyl methacrylate and salts thereof; styrene and its alkyl or halogen substituted compounds such as α-methyl styrene, chlorostyrene, etc.; basic vinyl compounds such as vinylpyridine, vinylimidazole, etc.; vinyl nitrile compounds such as methacrylonitrile, hydroxyethyl acrylonitrile, vinylidene cyanide, etc; vinyl aldehyde compounds such as acrolein, methacrolein, etc.; glycidyl esters of unsaturated carboxylic acids such as glycidyl acrylate, glycidyl methacrylate, glycidyl crotonate, glycidyl fumarate, glycidyl itaconate, etc.; glycidyl esters of unsaturated sulfonic acids such as glycidyl allylsulfonate, glycidyl methallylsulfonate, etc.; unsaturated glycidyl ethers such as vinyl glycidyl ether, methallyl glycidyl ether, etc.; acylic acid or methacrylic acid diesters such as ethylene glycol dimethacrylate, propylene glycol dimethacrylate, 1,3-butylene glycol dimethacrylate, neopentyl glycol dimethacrylate, diethylene glycol dimethacrylate, dipropylene glycol dimethacrylate, 1,3-butylene glycol diacrylate, neopentyl glycol diacrylate, diethylene glycol diacrylate, etc.; acrylic acid or methacrylic acid triesters such as trimethylolpropane trimethacrylate, trimethylolethane trimethacrylate, trimethylolpropane triacrylate, tetramethylolmethane triacrylate, etc.; acrylic acid or methacrylic acid tetraesters such as tetramethylolmethane tetraacrylate, etc.; allyl esters of unsaturated carboxylic acids such as allyl acrylate, etc.; diallyl esters of polyvalent carboxylic acids such as diallyl phthalate, diallyl fumarate, diallyl itaconate, etc.; divinyl acid anhydrides such as methacrylic acid anhydride, etc.; divinyl benzene and its alkyl or halogen substituted compounds.

The introduction of acid groups into the resulting polymer, which is an absolutely necessary condition for the present invention, can be easily attained by using, as the copolymerization component, any of the above-mentioned unsaturated sulfonic acids or their salts (for example alkali metal salts, ammonium salts, etc.) such as unsaturated hydrocarbon sulfonic acids or their salts, 2-acrylamide-2-methylpropane sulfonic acid or its salts, acrylic acid or methacrylic acid sulfoalkyl esters or their salts; and/or unsaturated carboxylic acids or their salts (for example alkali metal salts, ammonium salt, etc.) Among others, it is desirable to copolymerize any of the above-mentioned sulfonic acids or their salts in an amount not less than 0.1 weight %, preferably not less than 0.5 weight %, based on the total amount of the monomers composing the polymer, whereby the particle diameter of the resulting acrylonitrile polymer can be made fine and the stability of the resulting polymer can be remarkably improved. It is also possible to introduce acid groups into the polymer by using a reducing sulfoxy compound such as a sulfite as a component of polymerization initiators, or by using a chain transfer agent such as $SO_2$ so that sulfonic acid groups or its salts can be introduced into the terminal of the polymer molecule.

The introduction of a cross-linked structure into the resulting polymer can be readily attained by using a cross-linkable monomer having two or more copolymerizable double bonds in the molecule, such as diesters, triesters or tetraesters of acrylic acid or methacrylic acid, allyl esters of unsaturated carboxylic acids, divinyl acid anhydrides, or divinylbenzene and its alkyl or halogen substitutes; and/or a cross-linkable monomer having at least one epoxy group in the molecule, such as glycidyl esters of unsaturated carboxyl acids or unsaturated sulfonic acids, unsaturated glycidyl ethers, etc. so that the cross-linkable monomer is cross-linked at the time of polymerization or after the termination of polymerization. Among others, it is desirable to use a cross-linkable monomer having two or more copolymerizable double bonds in the molecule.

To produce the substantially water-insoluble and water-swellable substance (hydrogel) of the present invention in an industrially advantageous manner, it is desirable to copolymerize one of said cross-linkable monomers in an amount not less than 0.5 weight %, preferably not less than 1 weight %. As other methods of introducing a cross-linked structure into the resulting polymer, there can be mentioned a method wherein a monomer having a functional group cross-linkable by a condensation reaction like dehydration, such as unsaturated alcohols, unsaturated carboxylic acids and their salts, acrylamide and its alkyl substituted compounds, N-methylolacrylamide, etc. is used as a copolymerization component to cross-link it at the time of polymerization or after polymerization; a method wherein a monomer cross-linkable under the action of light or radiation, such as acrylic acid and its esters, vinyl acetate, styrene, etc. is used at the time of polymerization of after the termination of polymerization; or a method wherein a polyfunctional compound such as saturated polybasic acids, glycols, tri- or tetramethylol alkanes, etc. is suitably added to cross-link it at the time of polymerization or after the termination of polymerization. Of course, it is possible to use in combination two or more of the above-mentioned methods of introducing a cross-linked structure.

So far as a polymer having a particle diameter not larger than 1μ can be produced, the method of producing such an acrylonitrile polymer is not limited, but it is preferable to produce the acrylonitrile polymer in the form of an emulsion in which the polymer having the desired particle diameter is dispersed in water, because by this method, an additional step of dispersing the polymer in an aqueous medium is not necessary. However, in general, an acrylonitrile polymer, particularly having a high acrylonitrile content (for example not lower than 60 weight %) has a strong cohesive force between polymer particles, and therefore when such a polymer is produced according to the ordinary emulsion polymerization or suspension polymerization using water as the disperse medium, the resulting polymer particles will gather to form coarse and voluminous agglomerated particles. Therefore, it has been extremely difficult to obtain an aqueous emulsion of a polymer having a fine particle diameter. In the present invention, the following method is employed to produce an aqueous acrylonitrile polymer emulsion having a high acrylonitrile content and fine particle diameter, without using any emulsifier or dispersant which involves the problem of foaming upon using said emulsion or the problem of toxicity.

In this method, a monomer mixture composed of acrylonitrile and at least one other ethylenic unsaturated compound is polymerized in a polymerization apparatus equipped with a suitable pressurizing means and a stirrer, in a system in which water is present within the range of from 45 to 95 weight %, preferably 55 to 90 weight %, based on the total amount of monomers and water, under a pressure not lower than the vapor pressure generated in the polymerization system under the polymerization condition (autogeneous pressure), generally not lower than about 3 atmospheric pressure, preferably under about 5 to 50 atmospheric pressure, at a temperature not lower than 100° C., preferably between 120° and 250° C., under stirring, and a cross-linked structure is introduced into the resulting polymer while introducing at least one acid group selected from sulfonic acid group, sulfuric acid group and carboxyl group or their salts in an amount not less than $2 \times 10^{-5}$ mol/g polymer, preferably not less than $3 \times 10^{-5}$ mol/g polymer. By this method, it is possible to produce an aqueous dispersion of fine acrylonitrile polymer droplets in a substantially molten state. By this polymerization at such an elevated pressure and temperature and by the introduction of a specific amount of acid groups, the resulting polymer is in the form of fine molten droplets which have a less tendency to agglomerate together in comparison with solid particles. Also, agglomerated masses which may be generated by the collision of polymer droplets are formed again into single globular molten droplets by the surface tension of said molten droplets. By cooling this aqueous dispersion while stirring it so that the polymer droplets do not gather into masses, the acrylonitrile polymer having an introduced cross-linked structure is formed into an aqueous emulsion of a fine particle diameter. Such an aqueous emulsion can be used as a starting material of the present invention, but if desired, the acrylonitrile polymer particles may be removed from the aqueous emulsion by a suitable operation such as spray-drying, and can be used as dry particles. As regards the method of producing such an aqueous acrylonitrile polymer emulsion, a further detailed description is given in Japanese Patent Application No. 24334/1976. The production of the polymer emulsion can be advantageously practiced by employing the conditions described in this previous application.

The method of causing an alkaline substance to act on the above-mentioned acrylonitrile polymer or aqueous emulsion of said polymer is not limited so long as the microhydrogel can be obtained finally, and therefore any known alkali treatment can be employed.

Any known alkaline substance can be used for this purpose, but it is desirable to use hydroxides of alkali metals such as lithium, potassium, sodium, etc., because salt-type carboxyl groups can be easily introduced into the resulting microhydrogel, and therefore a hydrogel having a high degree of water-swellability can be produced.

The amount of the alkaline substance to be used should be varied depending upon the treating temperature, treating time, desired degree of water-swellability, etc., and therefore it is difficult to decide it definitely. But it is desirable to employ an alkali concentration not lower than 0.25 mol/1000 g, preferably in the range of 0.5 to 2.5 mol/1000 g. The aqueous medium to be used is preferably water, from the industrial point of view and from the convenience of the use of the final product, but even in the case of producing an aqueous microhydrogel dispersion, a water-miscible organic solvent such as methanol, ethanol, propanol, 2-methoxyethanol, 2-ethoxyethanol, dimethylformamide, dimethyl sulfoxide, etc. can be present in water in an amount within the range in which the microhydrogel does not precipitate. In the case where the resulting aqueous microhydrogel dispersion has the following formula:

$$C \times S \geq w$$

wherein C represents the hydrogel concentration (weight %) in the aqueous dispersion; S represents the degree of water-swellability (cc/g) of the hydrogel; and w represents the ratio (weight %) of water in the aqueous dispersion, the whole aqueous dispersion solidifies in the form of a jelly, so that it is impossible to produce a dispersion. In such a case, the following means is employed. A water-miscible organic solvent or an electrolytic salt is added beforehand to the medium to be treated, or after an excess amount of an alkaline substance is caused to act on the system, it is neutralized with an acid so that an addition of an electrolytic salt results. By such a method, the hydrogel in a water-swollen state is caused to contract so that the hydrogel can be in the form of an aqueous dispersion.

Also, the temperature condition at the time of the action of the alkaline substance can not be decided definitely. But it is desirable to use a temperature preferably not lower than 50° C., more preferably not lower than 80° C., because in general, the higher the temperature the greater is the reaction rate so that the treating effect is more advantageously attained.

The method of causing an alkaline substance to act on the acrylonitrile polymer or an aqueous emulsion of said polymer is selected widely from known methods in which an acrylonitrile polymer or an emulsion of said polymer is stirred or kneaded with an aqueous alkaline solution of a controlled alkali concentration, using a shearing apparatus such as screw-type stirrer, mixer, etc. or a kneading apparatus such as kneader.

When the thus-obtained aqueous microhydrogel dispersion should be used in this form, the remaining alkaline substance is neutralized with an acid such as sulfuric acid, nitric acid, acetic acid, etc. In the case where microhydrogel particles should be used after separation from the aqueous dispersion, the microhydrogel is precipitated by adding a water-miscible solvent to the aqueous dispersion which has been neutralized or not neutralized, and is separated by cetrifugation; or the microhydrogel is separated by spray-drying. The thus-separated microhydrogel is refined if desired, and finally dried to form a dry microhydrogel product.

It is necessary that the amount of the salt-type carboxyl groups represented by —COOX (wherein X represents an alkali metal or $NH_4$) introduced into the microhydrogel in the thus-formed aqueous dispersion or dry particles should be at least 0.1 m mol/g, preferably not less than 0.5 m mol/g. If the amount of the salt-type carboxyl groups is less than the above-recommended limit of the present invention, it is essentially impossible to give a hydrophilic or water-absorbing ability to the microhydrogel. The amount of the salt-type carboxyl groups introduced into the microhydrogel can be varied above the recommended limit of the present invention, in accordance with the composition, fine structure and particle diameter of the starting acrylonitrile polymer material, alkali treatment conditions (alkali concentration, treating time, temperature, etc.).

It is necessary that the degree of water-swellability of the microhydrogel thus produced should be not less than 3 cc/g, preferably not less than 5 cc/g. If such a degree of water-swellability is not satisfied, the microhydrogel can not exhibit the desired water-absorbing ability. The degree of water-swellability can be varied above the recommended limit of the present invention, in accordance with the amount of salt-type carboxyl groups or the amount of cross-linked structure introduced.

The microhydrogel of the present invention thus produced has an extremely fine particle diameter not larger than 1μ in absolute dryness, preferably not larger than 500 mμ. Thus, it has become possible to easily produce such a microhydrogel in the form of an aqueous dispersion or in the form of particles.

When the novel microhydrogel or its aqueous dispersion of the present invention as mentioned above is mixed with a synthetic high polymer material, it has become possible to give a moisture absorbing ability or water absorbing ability to synthetic fiber products or various plastic molded articles produced from said synthetic high polymer material. Especially, it is an advantage worthy of special mention of the present invention that the aqueous dispersion of such a microhydrogel can be produced in one step.

The aqueous microhydrogel dispersion of the present invention which is very stable can be used in this form (without re-dispersing or re-dissolving it in a medium) as a property-modifier to be mixed with a synthetic high polymer material, as a surface property-modifier for fibers or various molded products formed from said high polymer material, or as a soil improving agent. The aqueous microhydrogel dispersion is also excellent in the easiness of its handling.

Because of its fine particle diameter, the microhydrogel represents excellent permeability when used as a surface property-modifier, soil improving agent, etc. It is also a characteristic advantage of the microhydrogel of the present invention that when it is mixed with a starting material for producing synthetic fibers for example, spinnerette clogging, yarn breakage, fluffiness, etc. do not occur.

It is also possible to use the microhydrogel particles as a moisture-absorbing agent, drying agent, etc. or for use in sanitary products such as diapers which contain said particles inserted between pieces of a non-woven fabric.

For a better understanding of the present invention, examples are set forth hereunder, but the scope of the invention is by no means limited by the description of these examples. All percentages and parts described in the examples are by weight unless otherwise indicated. The water-swellability and the amount of salt-type carboxyl groups (—COOX) described in the following examples are measured and calculated according to the following methods.

1. Degree of water-swellability (cc/g)

About 0.5 g solid matter (microhydrogel particles) separated from an aqueous microhydrogel dispersion and refined, is immersed in pure water at 25° C. After 24 hours, the microhydrogel particles in a water-swollen state are placed between pieces of filter paper to remove excess water held among the hydrogel particles. This operation is repeated three times. The weight ($W_1$ grams) of the sample thus prepared is measured. The sample is then dried in a vacuum drier at 80° C. until it reaches a constant weight ($W_2$ grams). From the above measured results, the degree of water-swellability is calculated by the following formula:

$$\text{Degree of water-swellability} = \frac{W_1 - W_2}{W_2}$$

2. Amount of —COOX groups (m mol/g)

Approximately one gram of a thoroughly dried sample is weighed accurately (X gram). After 200 ml water is added to this sample, an aqueous 1 N hydrochloric acid is added while heating to 50° C. to adjust the pH to 2. Then a titration curve is obtained in the usual way using an aqueous 0.1 N caustic soda solution. From this titration curve, the amount of the caustic soda solution consumed by the carboxyl groups is obtained (Y cc). From the results of the above measurement, the amount of the carboxyl groups is calculated by the following formula:

$$\text{Amount of } -\text{COOX groups} = \frac{0.1 Y}{X}$$

If polyvalent cations are contained, the above formula must be corrected by obtaining the amount of these cations in the usual way.

EXAMPLE 1

One hundred parts of each of the monomer mixture compositions shown in Table 1 and 233 parts of water were put into a two-liter autoclave. After di-tert-butyl peroxide was added as the polymerization initiator in an amount of 0.5% based on the total amount of monomers, the autoclave was closed tightly. The monomer mixture was polymerized under stirring at 150° C. for 20 minutes. After the termination of the reaction, the polymerization system was cooled to about 90° C. while continuing stirring. Thereafter, the resulting product was taken out of the autoclave.

The average particle diameter of the polymer dispersed in each of the thus-obtained five kinds of aqueous acrylonitrile polymer emulsions (a–e), the solubility of the polymer in dimethylformamide (DMF) and the content of acid groups in the polymer were measured. The results are shown in Table 1.

The content of the sulfonic acid groups or its salt in the polymer was obtained by elemental analysis. The existence or absence of cross-linked structure introduced into the acrylonitrile polymer was evaluated by the solubility of the polymer in DMF, namely by the method in which one gram polymer is put into 100 cc DMF and is heated at 50° C. for one hour. The average particle diameter of the polymer was expressed by the number average diameter of the particles measured from electron microscopic photographs.

TABLE 1

| Sample no. | Monomer composition (parts) | Average particle diameter (mμ) | Acid group content ($\times 10^{-4}$ mol/g polymer) | Solubility in DMF |
|---|---|---|---|---|
| a | AN/DEGM/SPSS =90/3/7 | 88 | 4.8 | Insoluble |
| b | AN/DVB/SPSS =87/8/5 | 98 | 3.8 | Insoluble |
| c | AN/GMA/SPSS =90/5/5 | 100 | 3.0 | Insoluble |
| d | AN/DVB/MMA/SPSS =80/5/10/5 | 90 | 3.0 | Insoluble |
| e | AN/MA/SPSS =88/6/6 | 95 | 3.6 | Soluble |

Note:
SPSS = Sodium p-styrenesulfonic acid
DEGM = Diethylene glycol dimethacrylate
DVB = Divinyl benzene
GMA = Diglycidyl methacrylate
MMA = Methyl methacrylate
MA = Methyl acrylate Then, 20 parts of each of the five kinds of the aqueous acrylonitrile polymer emulsions (a–e) was added to 80 parts of a 5% aqueous caustic soda solution, and the solution was heated under stirring at 95° C. for 30 minutes to subject the polymer to alkali treatment. Among the five kinds of the reaction products thus obtained, when the aqueous acrylonitrile polymer emulsions (a–d) copolymerized with a cross-linkable monomer were used, aqueous microhydrogel dispersions (A–D) were obtained, respectively. But when the aqueous acrylonitrile polymer emulsion (e) which was not copolymerized with a cross-linkable monomer was used, the resulting product (E) became an aqueous solution with the passage of alkali treatment time, and no hydrogel was obtained.

The particle diameter, amount of —COONa groups and water-swellability of each of the thus obtained microhydrogels were measured and the results are shown in Table 2. The particle diameter of the respective microhydrogels is represented by the number average diameter of the particles measured from electron microscopic photographs.

TABLE 2

| Sample no. | Average particle diameter (mμ) | Amount of —COONa groups (m mol/g) | Degree of water-swellability (cc/g) |
|---|---|---|---|
| A | 89 | 8.7 | 250 |
| B | 98 | 7.5 | 46 |
| C | 100 | 9.2 | 85 |
| D | 92 | 8.3 | 110 |

From the results in Table 2, it is understood that the aqueous microhydrogel dispersions obtained by alkali treatment of the aqueous acrylonitrile polymer emulsions recommended in the present invention contain surprisingly fine particles stably dispersed in water and also have an excellent degree of water-swellability.

EXAMPLE 2

Five kinds of reaction products (F–J) were obtained, following the recipe of the acrylonitrile polymer emulsion (d) in Example 1, except that the alkali treatment conditions were varied as shown in Table 3.

The amount of —COONa groups and the degree of water-swellability of the thus obtained microhydrogels were measured and the results are shown in Table 3.

TABLE 3

| Sample no. | Alkali treatment conditions Conc. (%) | Temp. (°C.) | Time (min) | Amount of —COONa groups (m mol/g) | Degree of water-swellability (cc/g) |
|---|---|---|---|---|---|
| F | 10 | 95 | 25 | 7.8 | 105 |
| G | 10 | 95 | 10 | 5.2 | 70 |
| H | 5 | 90 | 10 | 3.7 | 45 |
| I | 2 | 90 | 20 | 2.3 | 28 |
| J | 0.8 | 90 | 20 | 0.1 | 1 |

From the results shown in Table 3, it is understood that it is possible to produce aqueous microhydrogel dispersions having various degrees of water-swellability.

When the alkali concentration was very low as 0.8% (0.2 mol/1000 g) (J), only a product of an insufficient degree of water-swellability was obtained.

EXAMPLE 3

Forty parts of the aqueous acrylonitrile polymer emulsion (d) described in Example 1 was added to 60 parts of a 15% aqueous caustic potash solution and was alkali-treated at 95° C. for 40 minutes under stirring. The thus-obtained microhydrogel was dispersed well in water, and the microhydrogel in this product (K) had a degree of water-swellability of 90 cc/g.

On the other hand, when the emulsion was alkali-treated in the same way as above except that a 5% aqueous caustic potash solution was used, the whole resulting product solidified in the form of a jelly after 15 minutes from the start of the reaction, and it was impossible to produce an aqueous microhydrogel dispersion.

When the above-mentioned aqueous microhydrogel dispersion (K) was added to a spinning solution consisting of 10 parts of an acrylonitrile polymer containing 90% acrylonitrile and 10% methyl acrylate and 90 parts of a 50% aqueous sodium thiocyanate solution in such a proportion that there were 5 parts of the microhydrogel for 100 parts of the acrylonitrile polymer. The fine microhydrogel particles were dispersed uniformly in the spinning solution without causing any agglomeration. The spinning solution was then wet-spun in the usual way. The spinning proceeded satisfactorily without problems such as spinnerette clogging, yarn breakage, etc. The moisture absorbing ability of the resulting fibers was 6% in an atmosphere of 25° C. and 60% relative humidity, which was remarkably improved in comparison with ordinary acrylonitrile fibers.

What is claimed is:

1. A process for producing an aqueous microhydrogel dispersion characterized by causing an alkaline substance to act on an acrylonitrile polymer containing acid groups and a cross-liked structure and having a particle diameter not larger than 1μ or on an aqueous emulsion of said polymer so as to introduce at least 0.1 m mol/g salt-type carboxyl groups represented by —COOX wherein X is an alkali metal or ammonium ion, thereby to form an aqueous dispersion in which a hydrogel having a degree of water-swellability not lower than 3 cc/g and a particle diameter not larger than 1μ in absolute dryness is stably dispersed in an aqueous medium.

2. The production process as claimed in claim 1 wherein the aqueous acrylonitrile polymer emulsion contains substantially no emulsifier or dispersant.

3. The production process as claimed in claim 1 wherein the acrylonitrile polymer is a polymer produced by copolymerizing a cross-linkable monomer in an amount of at least 0.5 weight % based on the total amount of monomers which form said polymer.

4. The production process as claimed in claim 3 wherein a monomer having two or more copolymerizable double bonds in the molecule is used as the cross-linkable monomer.

5. The production process as claimed in claim 1 wherein the acrylonitrile polymer is a polymer produced by copolymerizing an unsaturated sulfonic acid or a salt thereof and/or an unsaturated carboxylic acid or a salt thereof.

6. The production process as claimed in claim 1 wherein the acrylonitrile polymer is a polymer produced by copolymerizing not less than 0.1 weight %, based on the total amount of monomers composing said polymer, of an unsaturated sulfonic acid or a salt thereof.

7. The production process as claimed in claim 1 wherein an alkali metal hydroxide is used as the alkaline substance.

8. The production process as claimed in claim 1 wherein the alkaline substance is caused to act at a concentration not lower than 0.25 mol/1000 g based on the total amount of the aqueous medium to be alkali-treated.

9. The production process as claimed in claim 1 wherein the alkaline substance is caused to act at a temperature not lower than 50° C.

10. A process for producing a microhydrogel characterized by causing an alkaline substance to act on an acrylonitrile polymer containing acid groups and a cross-linked structure and having a particle diameter not larger than 1μ or on an aqueous emulsion of said polymer so as to introduce at least 0.1 m mol/g salt-type carboxyl groups represented by —COOX wherein X is an alkali metal or ammonium ion, thereby to form an aqueous dispersion in which a hydrogel having a degree of water-swellability not lower than 3 cc/g and a particle diameter not larger than 1μ in absolute dryness is stably dispersed in an aqueous medium and thereafter separating said microhydrogel from said aqueous dispersion.

11. The production process as claimed in claim 10 wherein an aqueous acrylonitrile polymer emulsion containing substantially no emulsifier or dispersant is used.

12. The production process as claimed in claim 10 wherein the acrylonitrile polymer is a polymer produced by copolymerizing at least 0.5 weight %, based on the total amount of monomers composing said polymer, of a cross-linkable monomer.

13. The production process as claimed in claim 12 wherein a monomer having at least two copolymerizable double bonds in the molecule is used as the cross-linkable monomer.

14. The production process as claimed in claim 10 wherein the acrylonitrile polymer is a polymer produced by copolymerizing an unsaturated sulfonic acid or a salt thereof and/or an unsaturated carboxylic acid or a salt thereof.

15. The production process as claimed in claim 10 wherein the acrylonitrile polymer is a polymer produced by copolymerizing not less than 0.1 weight %, based on the total amount of monomers composing said polymer, of an unsaturated sulfonic acid or a salt thereof.

16. The production process as claimed in claim 10 wherein an alkali metal hydroxide is used as the alkaline substance.

17. The production process as claimed in claim 10 wherein the alkaline substance is caused to act at a concentration not lower than 0.25 mol/1000 g based on the total amount of the aqueous medium to be alkali-treated.

18. The production process as claimed in claim 10 wherein the alkaline substance is caused to act at a temperature not lower than 50° C.

19. The production process as claimed in claim 10 wherein a water-miscible organic solvent is added to the aqueous microhydrogel to precipitate the microhydrogel.

20. The production process as claimed in claim 10 wherein the microhydrogel is separated from the aqueous microhydrogel dispersion by spray-drying.

* * * * *